US012297572B2

(12) United States Patent
Waugh et al.

(10) Patent No.: US 12,297,572 B2
(45) Date of Patent: May 13, 2025

(54) SYSTEMS AND METHODS FOR SELF-CLEANING NEEDLES FOR THROUGH THICKNESS REINFORCEMENT OF RESIN-INFUSED FABRICS

(71) Applicant: Rohr, Inc., Chula Vista, CA (US)

(72) Inventors: Katherine E. Waugh, San Diego, CA (US); Christopher C. Koroly, Spring Valley, CA (US); Vijay V. Pujar, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 18/165,271

(22) Filed: Feb. 6, 2023

(65) Prior Publication Data

US 2024/0141573 A1 May 2, 2024

Related U.S. Application Data

(60) Provisional application No. 63/421,096, filed on Oct. 31, 2022.

(51) Int. Cl.
*D04H 18/02* (2012.01)
*B08B 1/12* (2024.01)
*B08B 1/20* (2024.01)

(52) U.S. Cl.
CPC ............... *D04H 18/02* (2013.01); *B08B 1/12* (2024.01); *B08B 1/20* (2024.01); *D10B 2505/02* (2013.01)

(58) Field of Classification Search
CPC .......... D04H 18/02; D04H 18/00; D04H 1/46; D04H 3/102; D04H 3/105; D04H 5/02; D04H 13/005; D04H 1/4242; D04H 1/498; D05B 29/00; D05B 29/06; D05B 29/08; D05B 29/10; D05B 29/12; B08B 1/12; B08B 1/20; D10B 2505/02
(Continued)

(56) References Cited

U.S. PATENT DOCUMENTS 1,623,075 A * 4/1927 Thomas ................. D05B 29/00 112/117
1,686,439 A 10/1928 McP. Cooke
(Continued)

FOREIGN PATENT DOCUMENTS

CN 105755679 7/2016
CN 108103671 6/2018
(Continued)

OTHER PUBLICATIONS

English translation of CN 114474958 A (Year: 2022).*
(Continued)

*Primary Examiner* — Amy Vanatta
(74) *Attorney, Agent, or Firm* — SNELL & WILMER L.L.P.

(57) ABSTRACT

An end effector for the through thickness reinforcement of a fibrous preform includes a needle cleaning material configured to contact a needle to clean resin from the needle during or between through thickness reinforcement operations. The needle cleaning material may extend from a presser foot toward the needle. The needle cleaning material may slidingly engage the needle in response to movement of one of the needle or the presser foot moving (e.g., translating and/or rotating) with respect to the other of the needle or the presser foot.

16 Claims, 8 Drawing Sheets

(58) Field of Classification Search
USPC .................................................... 2/107–115
See application file for complete search history.

(56) References Cited

U.S. PATENT DOCUMENTS

| | | | | |
|---|---|---|---|---|
| 2,556,406 A * | 6/1951 | Wapner | D05B 29/00 112/261 |
| 2,601,432 A | 6/1952 | Clements | |
| 2,690,149 A | 9/1954 | Adams | |
| 2,896,303 A * | 7/1959 | Morrill | D04H 18/02 28/115 |
| 3,022,813 A | 2/1962 | Glover | |
| 3,605,223 A * | 9/1971 | Barth | D04H 18/00 28/115 |
| 3,611,958 A | 10/1971 | Rutledge | |
| 3,729,785 A * | 5/1973 | Sommer | D04H 18/02 28/115 |
| 3,889,326 A * | 6/1975 | Tyas | D04H 18/02 28/115 |
| 3,910,210 A | 10/1975 | Marforio | |
| 3,916,494 A | 11/1975 | Konig | |
| 4,305,339 A | 12/1981 | Inglis | |
| 4,353,158 A | 10/1982 | Henshaw | |
| 4,369,723 A | 1/1983 | Griffith, Jr. | |
| 4,777,706 A | 10/1988 | Stanislaw | |
| 5,016,331 A * | 5/1991 | Dilo | D04H 18/02 28/115 |
| 5,125,135 A * | 6/1992 | Kalteis | D04H 18/00 28/107 |
| 5,226,217 A | 7/1993 | Olry et al. | |
| 5,511,294 A | 4/1996 | Fehrer | |
| 5,513,423 A * | 5/1996 | Jakob | D04H 18/02 28/107 |
| 5,515,798 A | 5/1996 | Cahuzac | |
| 5,564,355 A * | 10/1996 | Watson | D05B 29/00 112/475.01 |
| 5,699,595 A | 12/1997 | Feyerl | |
| 5,800,672 A | 9/1998 | Boyce et al. | |
| 5,894,643 A * | 4/1999 | Fehrer | D04H 18/02 28/115 |
| 5,896,633 A | 4/1999 | Fehrer | |
| 6,161,269 A | 12/2000 | Dilo | |
| 6,233,797 B1 * | 5/2001 | Neely | D04H 18/02 28/115 |
| 6,405,417 B1 | 6/2002 | Sheehan et al. | |
| 6,735,837 B2 | 5/2004 | Pum | |
| 7,296,525 B2 | 11/2007 | Cho | |
| 7,497,001 B2 | 3/2009 | Hall et al. | |
| 8,192,662 B2 | 6/2012 | Asahara et al. | |
| 9,193,113 B2 | 11/2015 | La Forest et al. | |
| 10,448,706 B2 | 10/2019 | Ho | |
| 11,491,745 B2 | 11/2022 | Kim et al. | |
| 2003/0136502 A1 | 7/2003 | Lavasserie et al. | |
| 2003/0209179 A1 * | 11/2003 | Scordos | D05B 29/06 112/235 |
| 2013/0255047 A1 * | 10/2013 | Sasur | D04H 18/02 28/115 |
| 2013/0255556 A1 | 10/2013 | Hasegawa | |
| 2015/0152582 A1 | 6/2015 | Takizawa | |
| 2018/0103724 A1 * | 4/2018 | Ho | D05C 11/04 |
| 2020/0354870 A1 | 11/2020 | Groelz | |
| 2022/0184880 A1 | 6/2022 | Barnes et al. | |
| 2023/0295849 A1 * | 9/2023 | Deng | D04H 18/02 28/107 |

FOREIGN PATENT DOCUMENTS

| | | |
|---|---|---|
| CN | 108789447 | 11/2018 |
| CN | 110219097 | 9/2019 |
| CN | 209779164 | 12/2019 |
| CN | 112318499 | 2/2021 |
| CN | 114474958 A * | 5/2022 |
| CN | 114703605 | 7/2022 |
| DE | 202013105848 | 3/2015 |
| EP | 1384804 | 1/2004 |
| EP | 4144904 | 3/2023 |
| FR | 2794138 | 12/2000 |
| GB | 2310221 | 8/1997 |

OTHER PUBLICATIONS

European Patent Office, European Partial Search Report dated Apr. 16, 2024 in Application No. 23204626.8.
USPTO; Requirement for Restriction dated Mar. 28, 2024 in U.S. Appl. No. 17/978,104.
USPTO; Requirement for Restriction dated Apr. 18, 2024 in U.S. Appl. No. 18/165,238.
European Patent Office, European Search Report dated Feb. 16, 2024 in Application No. 23204703.5.
European Patent Office, European Search Report dated Feb. 16, 2024 in Application No. 23204191.3.
European Patent Office, European Search Report dated Jul. 8, 2024 in Application No. 23204626.8.
USPTO; Non-Final Office Action dated Aug. 15, 2024 in U.S. Appl. No. 17/978,104.
USPTO; Non-Final Office Action dated Aug. 29, 2024 in U.S. Appl. No. 18/165,238.

* cited by examiner

SYSTEMS AND METHODS FOR SELF-CLEANING NEEDLES FOR THROUGH THICKNESS REINFORCEMENT OF RESIN-INFUSED FABRICS

CROSS REFERENCE TO RELATED APPLICATIONS

This application claims priority to, and the benefit of, U.S. Provisional Patent Application Ser. No. 63/421,096, entitled "SYSTEMS AND METHODS FOR SELF-CLEANING NEEDLES FOR THROUGH THICKNESS REINFORCEMENT OF RESIN-INFUSED FABRICS," filed on Oct. 31, 2022. The '096 Application is hereby incorporated by reference in its entirety for all purposes.

FIELD

The present disclosure relates generally to the manufacture of carbon/carbon composites, and, more particularly, to cleaning of through thickness reinforcement needles.

BACKGROUND

Through thickness reinforced composites (i.e., composites with fibers inserted into the through thickness (or z-) direction of the laminate) generally provide higher interlaminar properties but lower in-plane properties compared to 2D lay-ups. One such example of through thickness reinforcement is needling, where in-plane fibers are moved to turn in the out-of-plane direction into the thickness of the preform using a needling process. Alternative through-thickness reinforcement methods include stitching, tufting, and others that are known to those skilled in the art, which insert a fiber filament (or similar) into the through thickness direction.

SUMMARY

An end effector for through thickness reinforcement of a fibrous preform is disclosed, comprising a body, a presser foot mounted to the body and moveable with respect to the body, a needle mounted to the body and moveable with respect to the body, and a needle cleaning material coupled to the presser foot. The needle is configured to move with respect to the body between a first extended position and a first retracted position.

In various embodiments, the needle is moveable with respect to the presser foot between the first extended position and the first retracted position, and the needle cleaning material is configured to slidingly contact the needle while the needle moves between the first extended position and the first retracted position to clean a surface of the needle.

In various embodiments, the presser foot is configured to move with respect to the body between a second extended position and a second retracted position, and the needle cleaning material is configured to slidingly contact the needle while the presser foot moves between the second extended position and the second retracted position to clean a surface of the needle.

In various embodiments, the needle cleaning material comprises at least one of a bristle brush or a rigid foam.

In various embodiments, the needle extends through the presser foot.

In various embodiments, the needle cleaning material extends from an interior surface of the presser foot.

In various embodiments, the needle is located adjacent to the presser foot.

In various embodiments, the needle cleaning material extends from an exterior surface of the presser foot.

In various embodiments, the end effector further comprises a spring member configured to bias the presser foot to the second extended position.

In various embodiments, the end effector further comprises an actuator for moving the presser foot between the second extended position and the second retracted position.

In various embodiments, the end effector further comprises an actuator for moving a first needle of the plurality of needles between the first extended position and the first retracted position.

In various embodiments, the end effector further comprises a rotary apparatus (e.g., an electric motor and/or a rotary actuator) for rotating the presser foot with respect to the needle, wherein the needle cleaning material is configured to slidingly contact the needle while the presser foot rotates with respect to the needle.

In various embodiments, the end effector further comprises a rotary apparatus (e.g., an electric motor and/or a rotary actuator) for rotating the needle with respect to the presser foot, wherein the needle cleaning material is configured to slidingly contact the needle while the needle rotates with respect to the presser foot.

A method for performing a through thickness reinforcement process on a fibrous preform is disclosed, the method comprising exerting a pressure on a fibrous preform with a presser foot, moving a needle from a first retracted position to a first extended position, slidingly contacting the needle with a needle cleaning material in response to the needle moving from the first retracted position to the first extended position, penetrating the fibrous preform with the needle in response to the needle moving from the first retracted position to the first extended position, and moving at least a portion of a fiber from a first layer of the fibrous preform into a second layer of the fibrous preform in response to the first needle penetrating the fibrous preform and/or moving a fiber filament through the first and second layers of the fibrous preform.

In various embodiments, the needle cleaning material extends from the presser foot.

In various embodiments, the method further comprises moving the presser foot with respect to the needle between a second extended position and a second retracted position, and slidingly contacting the needle with the needle cleaning material in response to the presser foot moving between the second extended position to the second retracted position.

An end effector for through thickness reinforcement of a fibrous preform is disclosed, the end effector comprising a body, a presser foot mounted to the body and moveable with respect to the body, a needle mounted to the body and moveable with respect to the body, and a needle cleaning material coupled to the presser foot, the needle cleaning material is configured to contact the needle.

In various embodiments, the end effector further comprises a rotary apparatus (e.g., an electric motor and/or a rotary actuator) configured to rotate the needle with respect to the presser foot, wherein the needle cleaning material slidingly engages the needle while the needle rotates with respect to the presser foot.

In various embodiments, the needle cleaning material extends from an interior surface of the presser foot toward the needle, and the needle extends at least partially through the presser foot.

In various embodiments, the end effector further comprises a rotary apparatus (e.g., an electric motor and/or a rotary actuator) configured to rotate the presser foot with respect to the needle, wherein the needle cleaning material slidingly engages the needle while the presser foot rotates with respect to the needle.

In various embodiments, the needle cleaning material extends from an exterior surface of the presser foot toward the needle, and the needle is disposed adjacent to the presser foot.

In various embodiments, the needle may be configured with one or more barbs along the length of the needle, wherein each barb is designed to entrain or capture one or more fibrous filaments within a ply or layer of the fibrous preform. In various embodiments, as the needle penetrates the fibrous preform, at least a portion of the entrained fibrous filaments in the barbs are transported along the direction of the penetrating needle to provide through-thickness reinforcement. In various embodiments, the needle may be alternatively or additionally configured to be a stitching or a tufting needle with an eye to transport fibrous filament along the direction of the penetration. It should be understood that, while needling is described in various embodiments of the present disclosure, stitching, tufting, and other through thickness reinforcement methods could be utilized in tandem or in place of needling without departing from the spirit and scope of the present disclosure.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
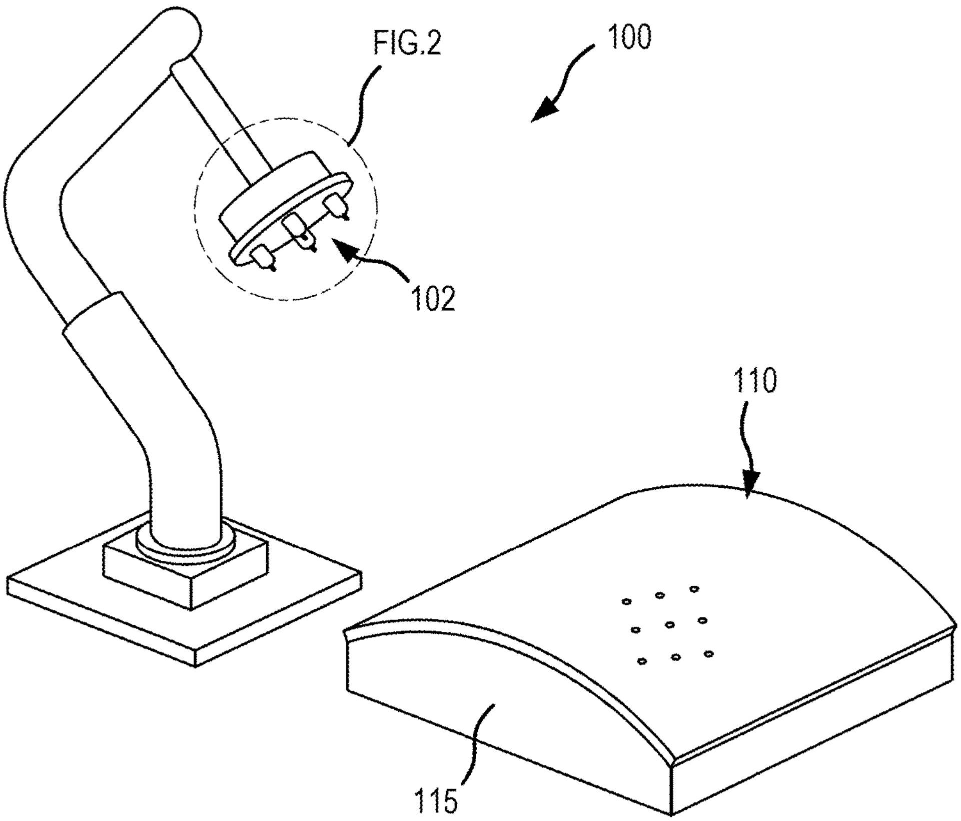
FIG. 1 is a perspective illustration of an exemplary robotic arm comprising an end effector during a through thickness reinforcement process of a fibrous preform, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

The present disclosure provides methods for cleaning needles in between punches of resin-infused fabrics, so as not to clog needle barbs or eyes. Textile needles may include small barbs to efficiently transport fibers in the through-thickness direction of the fibrous preform. In various embodiments, needles may include small eyes (in some cases in addition to small barbs) to transport a fiber filament in the through-thickness direction of the fibrous preform. If the barbs or eyes are clogged, then through thickness reinforcement (TTR) may be compromised. The premiere needle manufacturers do not recommend needling resin-infused fabrics for this reason.

In order to enable this type of through thickness reinforcement, a needle attachment is disclosed herein that may be mechanically or electrically actuated to run a needle cleaning material (e.g., bristle brushes, foam, or other) over the surface of the needle to effectively clean the needle barbs and eyes. Needle covers (also referred to herein as presser feet) may be automatically changed at specific frequencies depending on the resin content of the fabric, among other factors.

A self-cleaning needle arrangement of the present disclosure may utilize relative motion of the needle (e.g., linear and/or rotational) with respect to a needle cleaning material to clean the surface of the needle (including the barbs thereof if so equipped) during or between through thickness reinforcement processes. A self-cleaning needle arrangement of the present disclosure enables the manufacture of thick, complex contour, fibrous preforms via the through thickness reinforcement of resin-infused fabrics. A self-cleaning needle arrangement of the present disclosure tends to reduce cost and/or cycle time by reducing the amount of needle changeover (i.e., increasing time between needle tooling maintenance). A self-cleaning needle arrangement of the present disclosure tends to enable production of components via hybrid densification (resin and gas infiltration) through the use of resin-infused fabrics laid up in a complex contour.

With reference to FIG. 1, a robotic arm 100 comprising an end effector 102 is illustrated during a through thickness reinforcement process of a fibrous preform 110, in accordance with various embodiments. Fibrous preform 110 may be placed over a tool 115 and formed to the geometry of the tool 115. In this manner, fibrous preform 110 may be shaped into a compound contour preform (e.g., bent about one or more axes). Robotic arm 100 may be configured to move the end effector 102 with respect to the fibrous preform 110 in a controlled manner to perform a through thickness reinforcement process, such as Z-needling. Z-needling refers to a process comprising penetrating a composite material (e.g., fibrous preform 110) with needles and moving (e.g., by pulling or pushing) fibers from the in-plane direction and forcing them into the Z direction, where the "Z direction" as used herein refers to a direction perpendicular to the in-plane direction. For preforms having curved surfaces, the "Z-direction" refers to the direction normal to a (local) surface of the fibrous preform at the point where the preform is being needled (i.e., a direction normal to the tangent plane to the surface at the point of needling). In general, the Z-needling process has the effect of interlocking individual fabric layers together. The same effect may also be achieved by stitching or tufting, known to those skilled in the art to comprise inserting a fiber filament into the through-thickness direction. Thus, after through thickness reinforcement, the fibrous material has fibers extending in three different directions (i.e., in the X and Y directions in the plane of the fibrous layers and the Z direction perpendicular to the fibrous layers). It should be appreciated that due to the complex contours of the fibrous preform 110, the X, Y, and Z directions may vary depending on the particular location of the fibrous preform 110.

Figure 2:
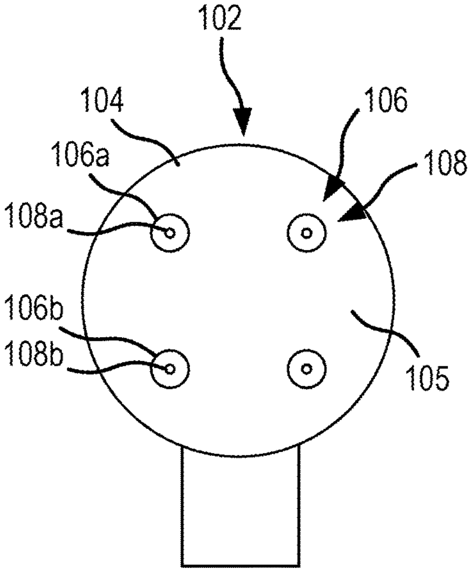
FIG. 2 is an illustration of a face of the end effector of FIG. 1, in accordance with various embodiments.

With reference to FIG. 2, a view of the face of end effector 102 is illustrated, in accordance with various embodiments. End effector 102 may comprise a head or body 104, a plurality of presser feet 106 (e.g., first presser foot 106*a*, second presser foot 106*b*, etc.), and a plurality of needles 108 (e.g., first needle 108*a*, second needle 108*b*, etc.). Body 104 may be made from a metal material, a composite material, or a plastic material. Body 104 may house various components for actuating presser feet 106 and/or needles 108. Presser feet 106 may be moveable with respect to body 104. Presser feet 106 may be moveable with respect to needles 108. Needles 108 may be moveable with respect to body 104. Needles 108 may be moveable with respect to presser feet 106. A face 105 of the body may be flat or planar. Face 105 may face the fibrous preform during the through thickness reinforcement process. In various embodiments, presser feet 106 and needles 108 extend from face 105.

In various embodiments, each presser foot 106 comprises a cylindrical body with a hemispherical-shaped end; though other presser foot 106 shapes and/or designs are contemplated herein. Each presser foot 106 may be made from a metal material, a rubber material, a composite material, and/or a plastic material. The material of presser foot 106 may be selected based on the desired pressure exerted onto fibrous preform 110, among other factors.

In various embodiments, each needle 108 may be made from a metal material, a composite material, or a plastic material. The material of needle 108 may be selected depending on the material of fibrous preform 110, among other factors.

Figure 3:
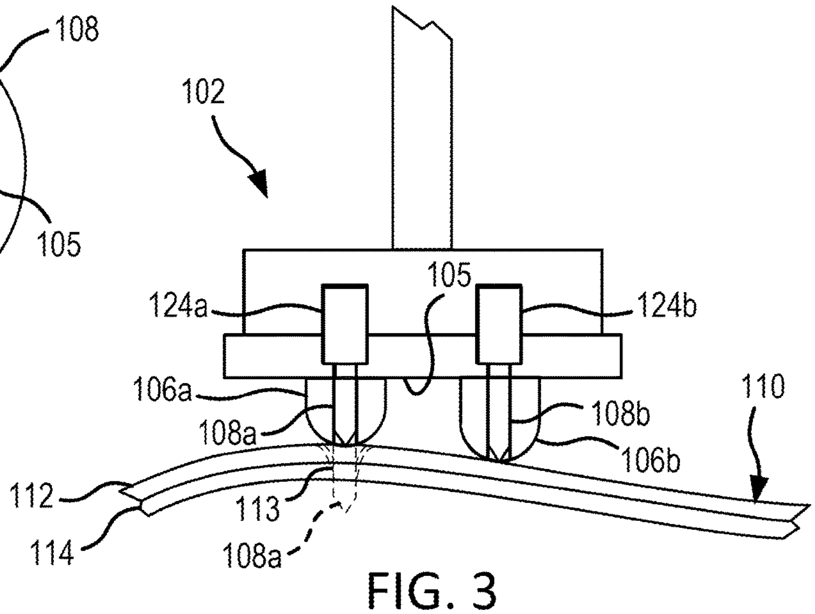
FIG. 3 is a schematic sectional illustration of the end effector during a through thickness reinforcement process, in accordance with various embodiments.

With reference to FIG. 3, end effector 102 is illustrated during a through thickness reinforcement process of fibrous preform 110. Fibrous preform 110 may comprise a first layer 112 and a second layer 114. First layer 112 may be a top layer. Each layer of material may share a common (e.g., the same) construction and/or material makeup. Each layer of material, for example, may be formed by a sheet/layer of fibrous material; e.g., woven carbon fiber, woven oxidized polyacrylonitrile (PAN) fibers, non-crimp fabric, etc. One or more or all the layers of material may each be impregnated with a polymer matrix; e.g., thermoset material or thermoplastic material. One or more or all of the layers of material may each be unimpregnated (e.g., only include the fibrous material) where, for example, the preform material is impregnated subsequent to formation of the composite structure. The method of the present disclosure, however, is not limited to such exemplary layer materials.

End effector 102 may be moved (e.g., via robotic arm 100) with respect to fibrous preform 110. With the end effector 102 in the desired position, one or more needles may be actuated to penetrate fibrous preform 110, thereby moving one or more fibers 113 from first layer 112 into second layer 114 and interlocking first layer 112 with second layer 114. For example, needle 108*a* is illustrated in FIG. 3 moving from a non-penetrating position to a penetrating position (also referred to herein as a retracted position (see needle 108*b*) and an extended position (see needle 108*a*), respectively). In this regard, needles 108 may be referred to herein as articulating needles. Needle 108*b* may be similarly operated. Needles 108*a* and 108*b* can be controlled individually or in groups by programmable robotic system (e.g., see control unit 250 of FIG. 6 through FIG. 9) to puncture the plies of fibrous preform 110 to a desired depth, at a desired angle, and/or a desired needling density (e.g., various needles 108 may be commanded not to penetrate the fibrous preform to vary a needling density (i.e., number of needles per unit area)). The needles 108*a* and 108*b* may be configured to puncture the fibers in the top ply or a sacrificial ply layer into the adjacent plies at the desired angle and depth. The end effector 102 may be rotated to appropriate angles to needle plies at different desired angles.

In various embodiments, end effector 102 further includes an actuator for each needle 108. In various embodiments, each actuator may actuate a single needle or a zone of needles (e.g., a row of needles or a column of needles in accordance with various embodiments). Needles 108 may be actuated independent of the position of the presser feet 106. In the illustrated embodiments, needles 108*a* and 108*b* comprise actuators 124*a* and 124*b*, respectively, for extending and/or retracting the respective needle 108*a* and 108*b*.

FIG. 3 illustrates presser foot 106*a* in a retracted position and presser foot 106*b* in an extended position, whereby the presser feet 106 apply a pressure to the fibrous preform 110 during the through thickness reinforcement process. Presser feet 106 may apply a desired pressure to the fibrous preform 110 to secure the fibrous preform 110 while the fibrous preform 110 is needled by needles 108. In this regard, presser feet 106 may be referred to herein as articulating presser feet.

Figure 4A:
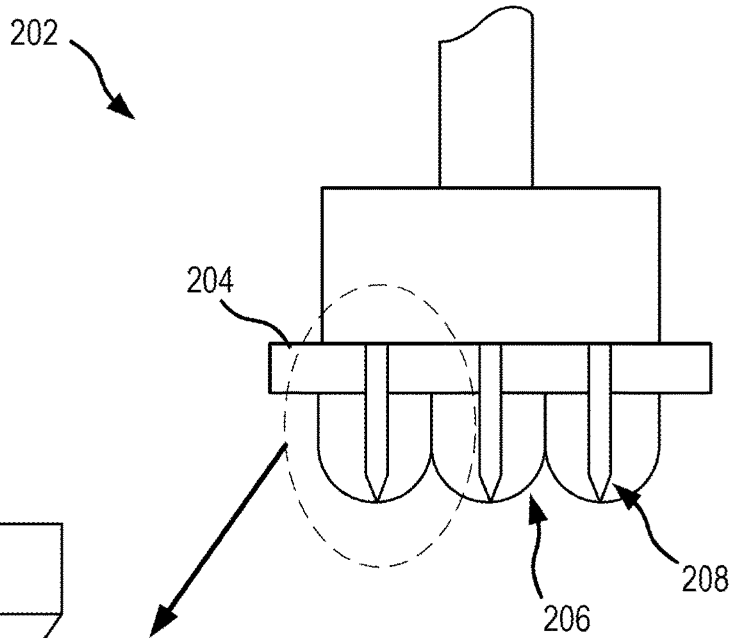
FIG. 4A is a schematic illustration of an end effector having self-cleaning needles that extend through presser feet, in accordance with various embodiments.

FIG. 4A illustrates an end effector 202 comprising a plurality of self-cleaning needles 208, in accordance with various embodiments. End effector 202 may be similar to end effector 102 of FIG. 1 through FIG. 3, in accordance with various embodiments. End effector 202 comprises a head or body 204, presser feet 206, and needles 208.

Figure 4B:
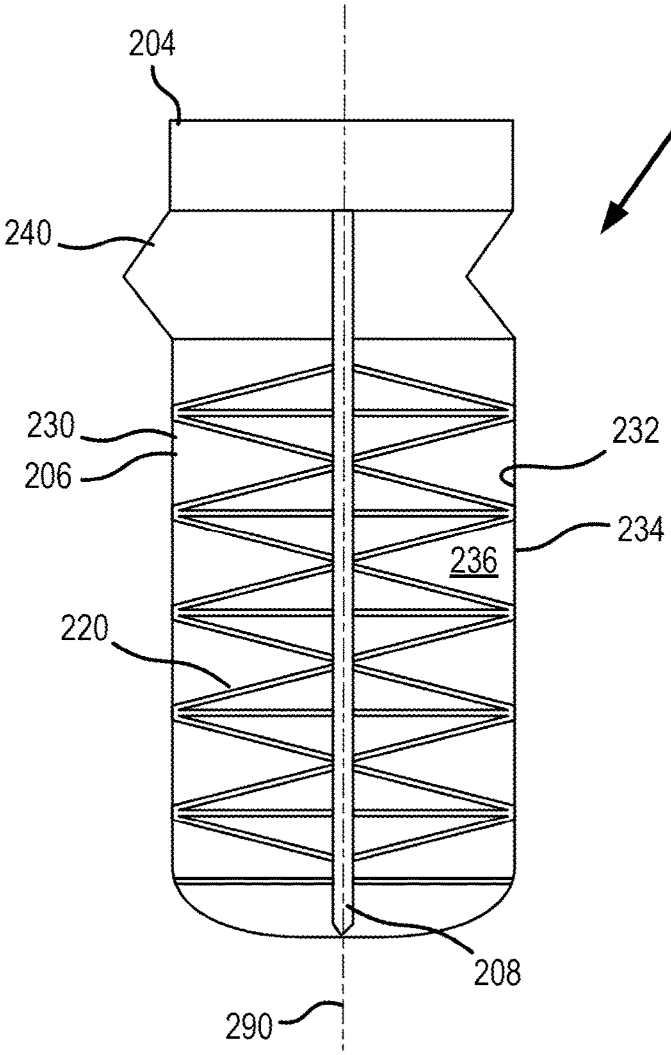
FIG. 4B is a detailed schematic illustration of a self-cleaning needle of the end effector of FIG. 4A, in accordance with various embodiments.

FIG. 4B is a detailed, schematic illustration of a presser foot 206 coupled to body 204. Presser foot 206 may comprise a generally cylindrical body 230 comprising an interior surface 232 defining a cavity 236 and an exterior surface 234. In various embodiments, needle 208 extends through presser foot 206. In various embodiments, needle 208 and presser foot 206 are coaxially aligned along central axis 290.

A needle cleaning material 220 may extend from presser foot 206 toward needle 208. Needle cleaning material 220 may be configured to contact needle 208 to clean resin from the needle 208 during and/or between through thickness reinforcement processes. In various embodiments, a needle cleaning material of the present disclosure (e.g., needle cleaning material 220) comprises a bristle brush. In various embodiments, needle cleaning material of the present disclosure may comprise bristle brushes made of synthetic or metallic materials depending on the resistance of the particular resin to be "cleaned" off the needles. Exemplary synthetic materials include nylon, PVC, polyethylene, and (poly)styrene, among others. Exemplary metallic materials include brass, bronze, stainless steel, and carbon steel, among others. The needle cleaning material may be coupled with a coating on the needle, where the coating may be selected to not be wetted by the resin. Alternatively, or in addition, the needle may have a coating to be wear-resistant to the withstand the cleaning by the needle cleaning material. In various embodiments, a needle cleaning material of the present disclosure (e.g., needle cleaning material 220) comprises a rigid foam. Polyurethane and polystyrene are two exemplary rigid foam materials. The rigid foam may completely encapsulate the needle within the presser foot to clean resin away from the needles. The rigid foam may be designed to extend far enough from the exterior reciprocating presser foot to completely encapsulate the needle to clean resin away from the needles. Needle cleaning material 220 may surround needle 208.

Needle cleaning material 220 may be configured to slidingly engaged needle 208 in response to a variety of relative movement between needle 208 and presser foot 206. In various embodiments, needle 208 may remain stationary with respect to body 204 and presser foot 206 may translate along central axis 290 between an extended position (e.g., see presser foot 106*b* of FIG. 3) and a retracted position (e.g., see presser foot 106*a* of FIG. 3). For example, presser foot 206 may be coupled to body 204 via a spring member 240. Spring member 240 may be tailored to provide a desired amount of pressure on the fibrous preform during the through thickness reinforcement process. Spring member 240 may bias presser foot 206 toward the extended position. Presser foot 206 may translate along central axis 290, against the bias of spring member 240, in response to the presser foot 206 contacting the fibrous preform. In various embodiments, spring member 434 is a coil spring. Needle cleaning material 220 may slidingly engage needle 208 in response to presser foot 206 translating between the extended position and the retracted position.

In various embodiments, presser foot 206 may remain stationary with respect to body 204 and needle 208 may translate along central axis 290 between a retracted position and an extended position (e.g., see needle 108*a* of FIG. 3). In this regard, needle cleaning material 220 may slidingly engage needle 208 in response to needle 208 translating between the retracted position and the extended position (e.g., during or between through thickness reinforcement processes).

Figure 5A:
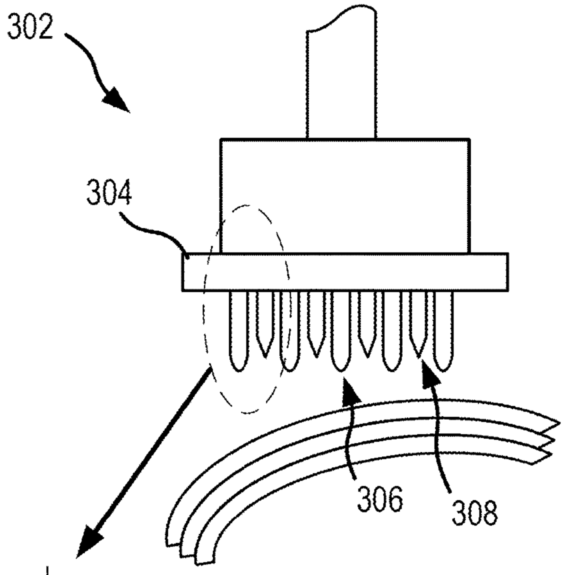
FIG. 5A is a schematic illustration of an end effector having self-cleaning needles disposed adjacent to presser feet, in accordance with various embodiments.

FIG. 5A illustrates an end effector 302 comprising a plurality of self-cleaning needles 308, in accordance with various embodiments. End effector 302 may be similar to end effector 102 of FIG. 1 through FIG. 3, in accordance with various embodiments. End effector 302 comprises a head or body 304, presser feet 306, and needles 308.

Figure 5B:
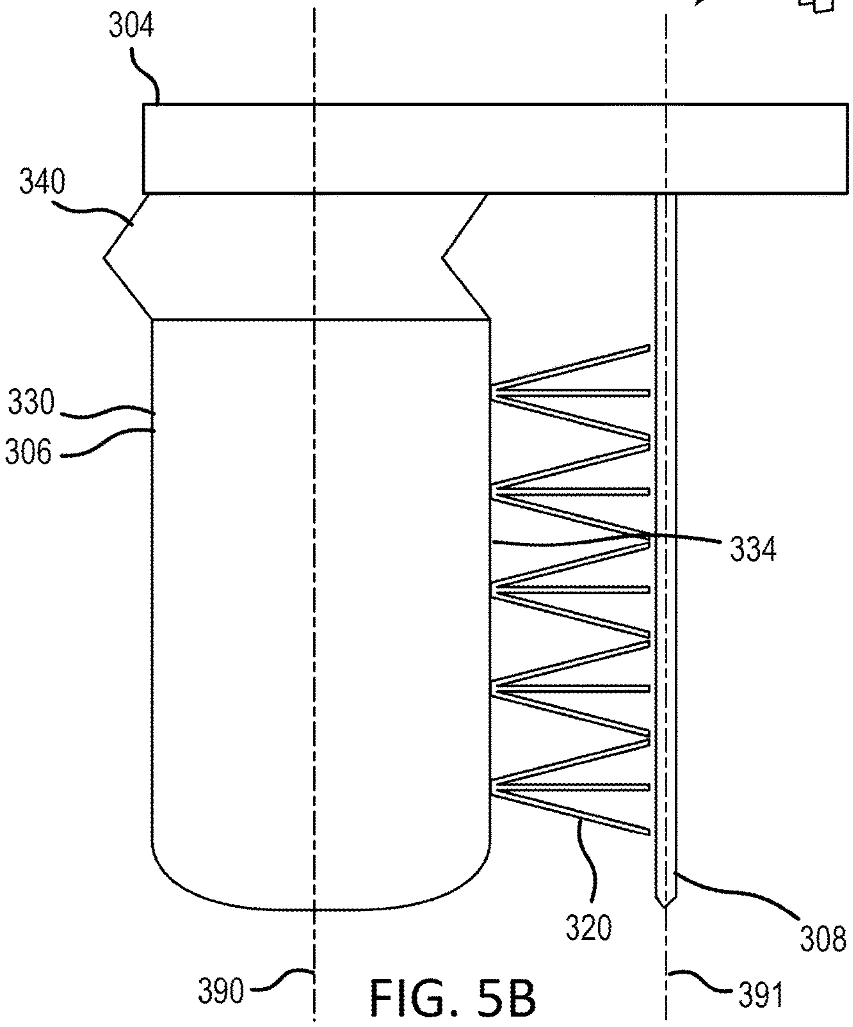
FIG. 5B is a detailed schematic illustration of a self-cleaning needle of the end effector of FIG. 5A, in accordance with various embodiments.

FIG. 5B is a detailed, schematic illustration of a presser foot 306 coupled to body 304. Presser foot 306 may comprise a generally cylindrical body 330 comprising an exterior surface 334. In various embodiments, needle 308 is disposed adjacent to presser foot 306. Presser foot 306 may define a central axis 390. Needle 308 may define a central axis 391.

A needle cleaning material 320 may extend from presser foot 306 toward needle 308. Needle cleaning material 320 may be configured to contact needle 308 to clean resin from the needle 308 during and/or between through thickness reinforcement processes. Needle cleaning material 320 may be configured to slidingly engaged needle 208 in response to a variety of relative movement between needle 308 and presser foot 306. In various embodiments, needle 308 may remain stationary with respect to body 304 and presser foot 306 may translate along central axis 390 between an extended position (e.g., see presser foot 106*b* of FIG. 3) and a retracted position (e.g., see presser foot 106*a* of FIG. 3). For example, presser foot 306 may be coupled to body 304 via a spring member 340. Needle cleaning material 320 may slidingly engage needle 308 in response to presser foot 306 translating between the extended position and the retracted position. In various embodiments, presser foot 306 may remain stationary with respect to body 304 and needle 308 may translate along central axis 391 between a retracted position and an extended position (e.g., see needle 108*a* of FIG. 3). In this regard, needle cleaning material 320 may slidingly engage needle 308 in response to needle 308 translating between the retracted position and the extended position (e.g., during or between through thickness reinforcement processes). In various embodiments, needle cleaning material 320 cleans only a portion of needle 308 (e.g., one fourth or one half of a circumference) and other adjacent needle cleaning materials (similarly situated adjacent to needle 308) clean the other portion(s) of needle 308.

Figure 6:
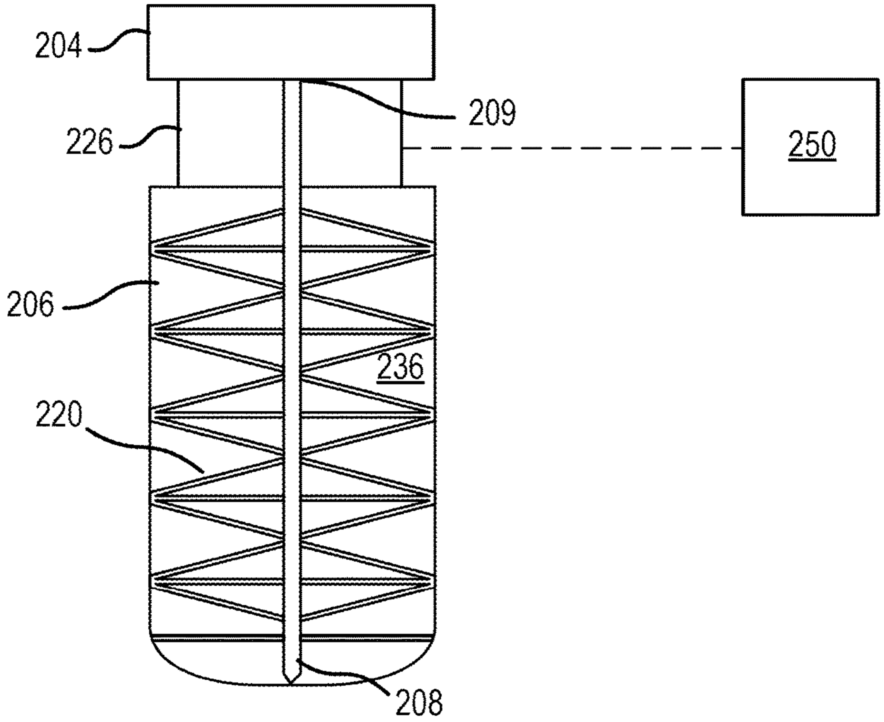
FIG. 6 is a schematic illustration of a self-cleaning needle extending through an electronically activated presser foot, in accordance with various embodiments.

Having described presser foot 206 of FIG. 4B as being passively activated by spring member 240, FIG. 6 illustrates presser foot 206 coupled to body 204 via a linear actuator 226, in accordance with various embodiments. In this regard, presser foot 206 may be actively activated with a linear actuator 226 to move presser foot 206 between the extended position and the retracted position to apply pressure to a fibrous preform during a through thickness reinforcement process. Actuator 226 may be activated to translate presser foot 206 between the extended and retracted positions to clean needle 208. As the actuator 226 translates presser foot 206 between the extended and retracted positions, the needle cleaning material slidingly engages (contacts) needle 208 to clean resin and/or other debris therefrom.

In various embodiments, a control unit 250 is provided, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 250 controls, at least various parts of, and operation of various components of, the end effector 202 (see FIG. 4A). For example, the control unit 250 may control a position of end effector 202 with respect to the fibrous preform, the position of presser foot 206 (e.g., via actuator 226), the position of needle 208 (e.g., via actuator 124*a* (see FIG. 3)), and/or may receive feedback from one or more sensors.

In various embodiments, presser foot 206 may be fixed to the base 209 of needle 208 via linear actuator 226. The needle 208 may be disposed in the cavity 236 of presser foot 206. During a through thickness reinforcement process, presser foot 206 may contact the fibrous preform (e.g., before the needle 208 contacts the fibrous preform). The control unit 250 may be programmed to retract presser foot 208 to allow the needle 208 to penetrate and transport through the fibrous preform. Then, when the needle 208 lifts up from the fibrous preform, the control unit 250 may be programmed to translate presser foot 208 down and cover the needle 208 (thus, translating the needle cleaning material 220 across the exterior surface (e.g., the outside diameter) of the needle 208). The translating action of the needle 208 and the presser foot 206 (both before and after punching into the fibrous preform fabric) may allow the needle cleaning material 220 to clear resin away from the barbs of the needle 208. Control via linear actuator 226 may tend to provide a more rigid system than one controlled by springs or other similar mechanisms.

Figure 7:
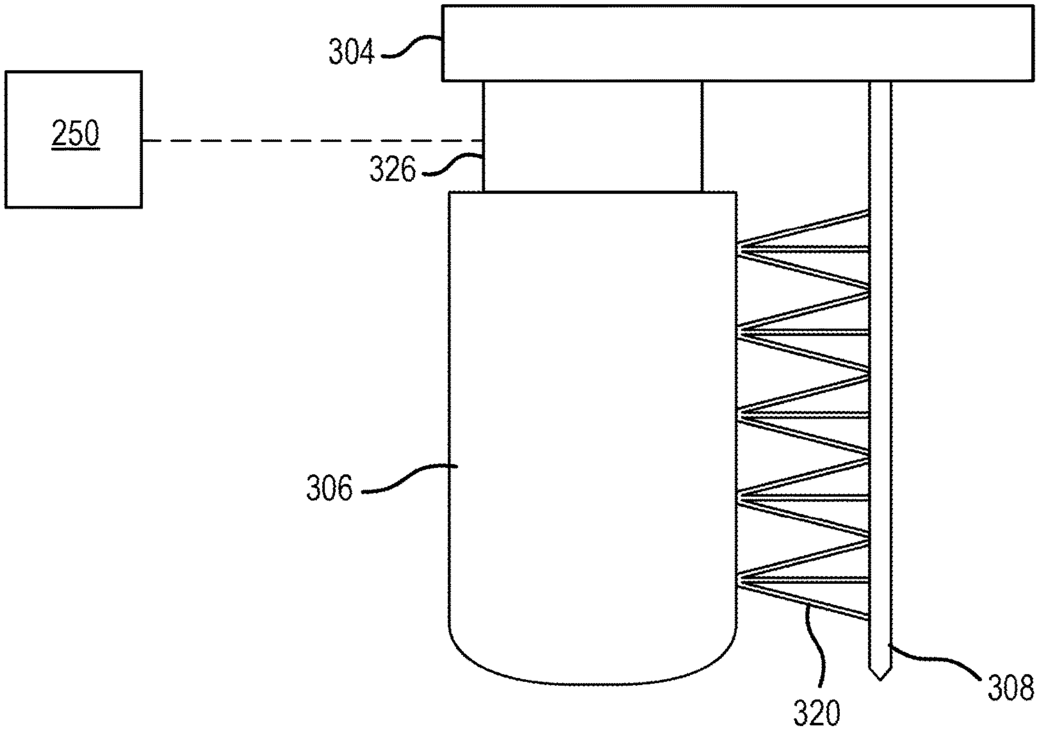
FIG. 7 is a schematic illustration of a self-cleaning needle disposed adjacent to an electronically activated presser foot, in accordance with various embodiments.

Having described presser foot 306 of FIG. 5B as being passively activated by spring member 340, FIG. 7 illustrates presser foot 306 coupled to body 304 via a linear actuator 326, in accordance with various embodiments. In this regard, presser foot 306 may be activated with linear actuator 326 to move presser foot 306 between the extended position and the retracted position to apply pressure to a fibrous preform during a through thickness reinforcement process. Actuator 326 may be activated to translate presser foot 306 between the extended and retracted positions to clean needle 308. As the actuator 326 translates presser foot 306 between the extended and retracted positions, the needle cleaning material slidingly engages (contacts) needle 308 to clean resin and/or other debris therefrom.

In various embodiments, the needle cleaning material 320 may be a separately actuated component that is programmed (e.g., using control unit 250) to translate up and down the needle 308 in between fabric punches. This needle cleaning material 320 may be attached to adjacent presser foot 306. The purpose of the presser foot 306 is, in various embodiments, to conform and compact the surface of the composite preform, which the neighboring needles penetrate the fabric. However, presser foot 306 may be a separately actuated member for the purposes of cleaning needle 308. Additionally, the needle cleaning material 320 could be attached to other linearly translating components such as a roller, a tensioner, etc.

Figure 8:
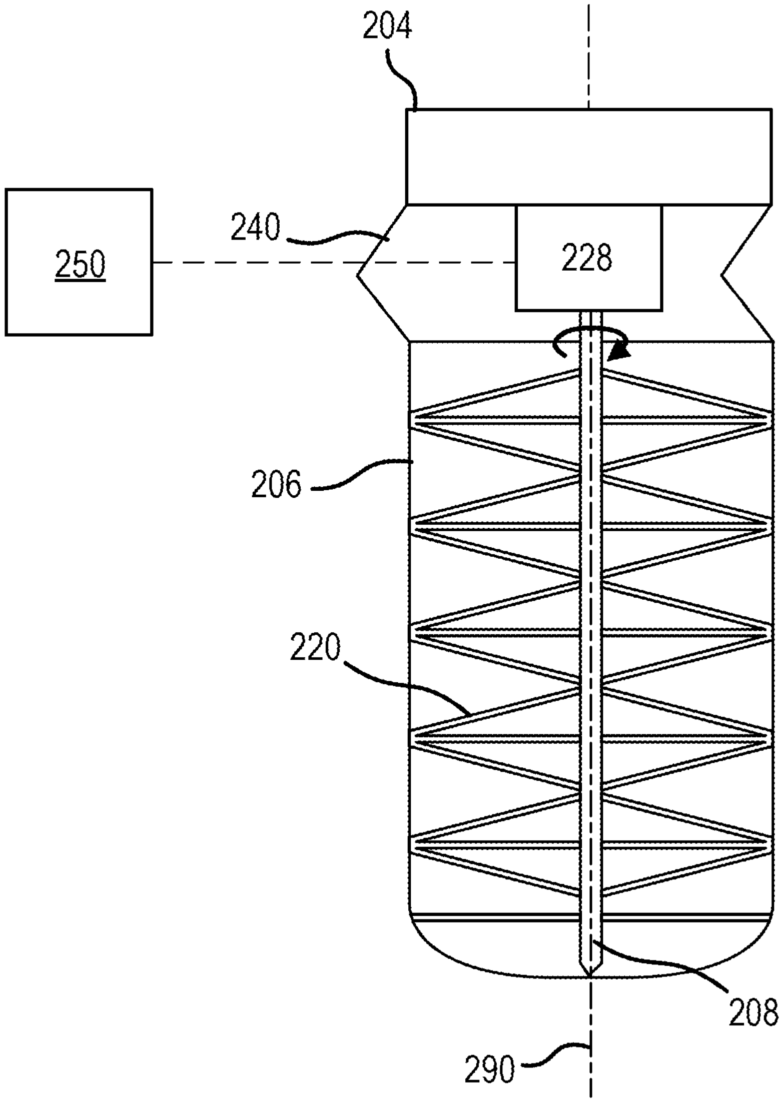
FIG. 8 is a schematic illustration of a self-cleaning needle configured to rotate with respect to a presser foot, in accordance with various embodiments.

FIG. 8 is a schematic illustration of self-cleaning needle 208 configured to rotate about central axis 290 with respect to needle cleaning material 220. Needle 208 may be mounted to body 204 via a rotary apparatus 228, such as a rotary actuator and/or an electric motor. configured to rotate needle 208 with respect to needle cleaning material 220. In this regard, control unit 250 may be configured to activate rotary apparatus 228 to rotate needle 208 to clean the outside surface of needle 208 during or between through thickness reinforcement processes. Although illustrated with spring member 240, rotary apparatus 228 may also be used to rotate a needle 208 in connection with an electrically activated presser foot 206 (e.g., presser foot 206 of FIG. 6 and/or presser foot 306 of FIG. 7). Moreover, rotary apparatus 228 may also be used to rotate a needle 208 located adjacent a presser foot 206 (e.g., presser foot 306 of FIG. 5B or presser foot 306 of FIG. 7).

Figure 9:
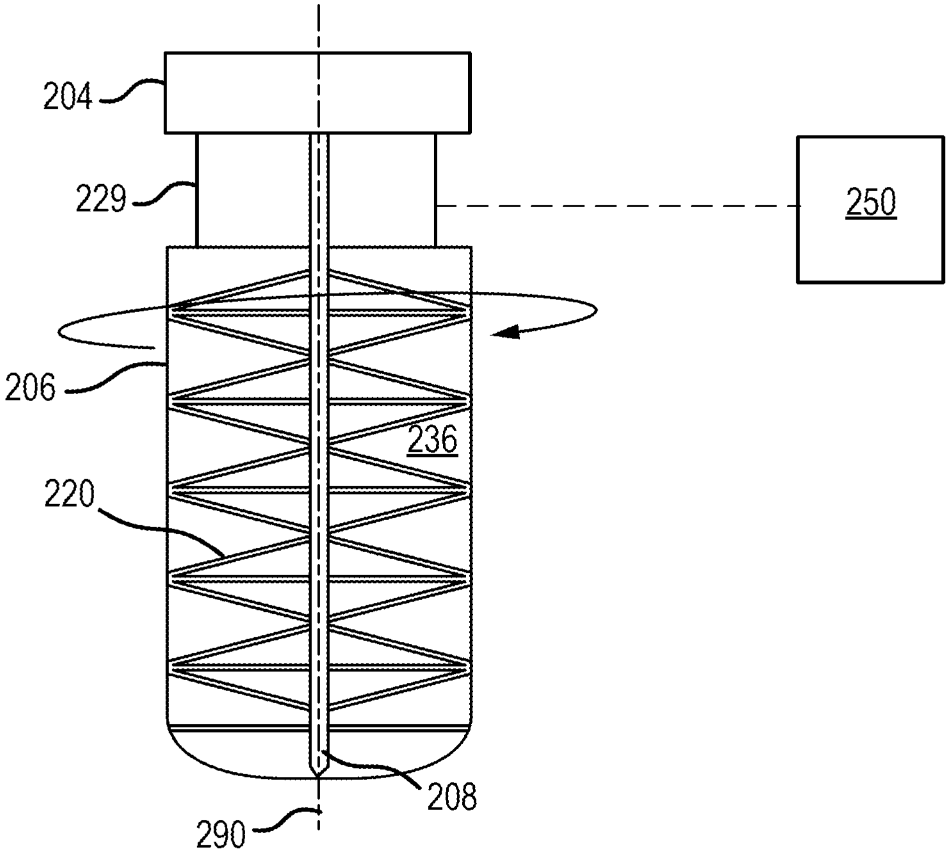
FIG. 9 is a schematic illustration of a self-cleaning needle and a presser foot configured to rotate with respect to the needle, in accordance with various embodiments.

FIG. 9 is a schematic illustration of a self-cleaning needle 208 and a presser foot 206 having needle cleaning material 220 configured to rotate about central axis 290 with respect to needle 208. Presser foot 206 may be mounted to body 204 via a rotary apparatus 229, such as a rotary actuator and/or an electric motor, configured to presser foot 206 with respect to needle 208. As the presser foot 206 and needle cleaning material 220 rotate together about central axis 290 with respect to needle 208, the needle cleaning material 220 slidingly engages the outer surface of the needle 208 to clean resin and/or debris therefrom. In this regard, control unit 250 may be configured to activate rotary apparatus 229 to rotate presser foot 206 and needle cleaning material 220 to clean the outside surface of needle 208 during or between through thickness reinforcement processes. It should be understood that rotary apparatus 229 may also be used to rotate presser foot 206 as described with respect to FIG. 4B and/or FIG. 6 and may also be used to rotate presser foot 306 as described with respect to FIG. 5B and/or FIG. 7.

Figure 10:
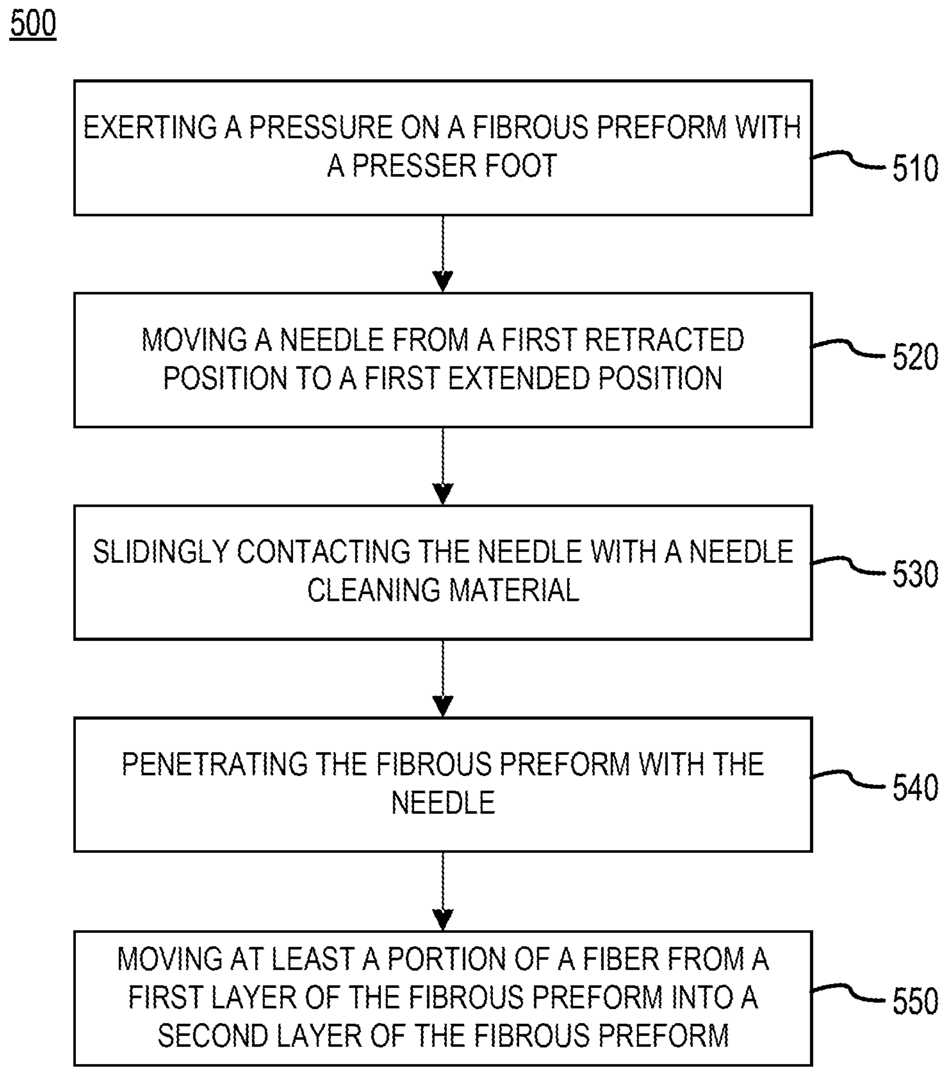
FIG. 10 is a flow chart of a method for performing a through thickness reinforcement process on a fibrous preform, in accordance with various embodiments.

With reference to FIG. 10, a flow diagram of a method 500 for performing a through thickness reinforcement process on a fibrous preform is provided, in accordance with various embodiments. For ease of description, the method 500 is described below with reference to FIG. 3, 4B. The method 500 of the present disclosure, however, is not limited to use of the exemplary end effector 102, 202 of FIG. 3, 4B.

Step 510 may include exerting a pressure on fibrous preform 110 with a presser foot 106. The pressure may be exerted by moving end effector 102 toward fibrous preform. The pressure may be exerted by extending presser foot 106 toward fibrous preform. The pressure may be tailored using a biasing member (e.g., see spring member 240).

Step 520 may include moving needle 108*a* from a first retracted position to a first extended position (e.g., see FIG. 3). Step 520 may be performed using actuator 124*a* and control unit 250.

Step 530 may include slidingly contacting the needle 208 with a needle cleaning material 220 in response to the needle 208 moving from the first retracted position to the first extended position.

Step 540 may include penetrating the fibrous preform 110 with the needle 108*a* in response to the needle 108*a* moving from the first retracted position to the first extended position.

Step 550 may include moving at least a portion of a fiber 113 from a first layer 112 of the fibrous preform 110 into a second layer 114 of the fibrous preform 110 in response to the needle 108*a* penetrating the fibrous preform 110. In various embodiments, as is understood by those skilled in the art, step 550 may include pulling a fiber filament through the fibrous preform 110 in a stitching or tufting operation.

In various embodiments, method 500 may further include moving presser foot 206 with respect to needle 208 between a second extended position and a second retracted position. The needle 208 may slidingly contact with the needle cleaning material 220 in response to the presser foot 206 moving between the second extended position to the second retracted position.

Once the needle cleaning material 220 is full of cleared away resin, the needle cleaning material 220 may be replaced or cleaned. In various embodiments, a separate needle cleaning material (e.g., bristle brushes) may be actuated across the needle cleaning material 220 in order to clean out the resin that is filling the needle cleaning material 220. Cleaning could be purely mechanical or may include a solvent. Needle cleaning material cleaners could be implemented in any of the aforementioned embodiments. This may ensure that the self-cleaning system remains functional throughout through thickness reinforcement operations.

Figure 11A:
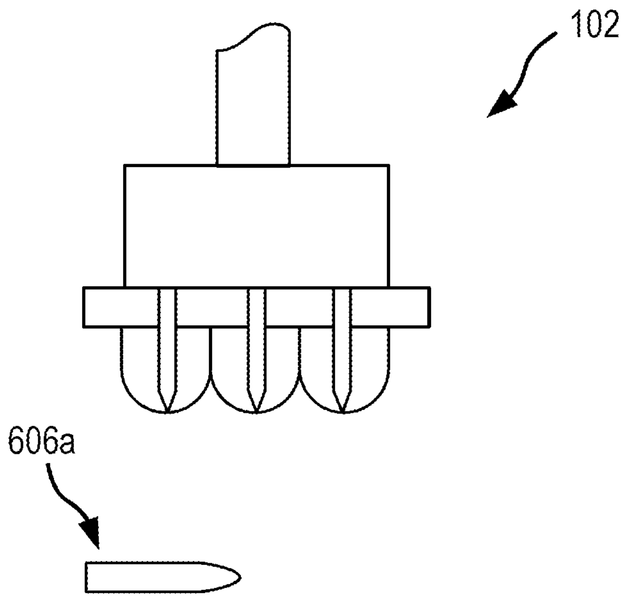
FIG. 11A and FIG. 11B are schematic illustrations of a robotic end effector discarding used presser feet and picking up new presser feet, respectively, in accordance with various embodiments.
Figure 11B:
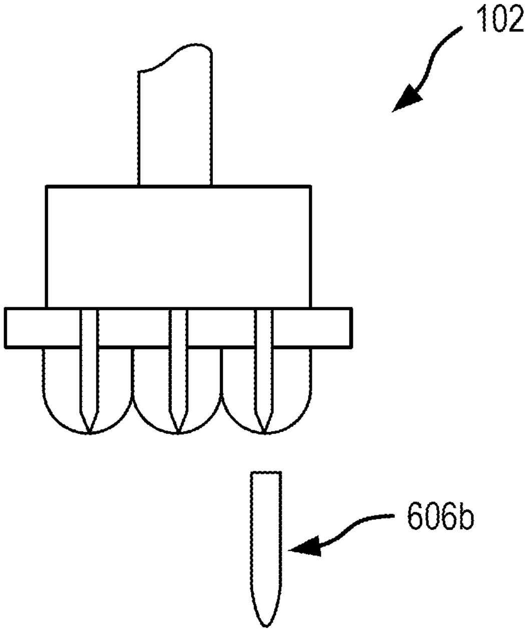

In various embodiments, once the needle cleaning material 220 is full of cleared away resin, the needle cleaning material 220 may be replaced. The programmable robotic needling head (e.g., end effector 102) may be programmed using control unit 250 to discard and pick up new presser feet 106. FIG. 11A and FIG. 11B illustrates end effector 102 having discarded a used or dirty presser foot 606*a* and picking up a new presser foot 606*b*, respectively. After a predetermined number of punches, the end effector 102 may be programmed to discard the used presser foot 606*a* in a pre-determined area. The presser foot 606*a* may be attached to the end effector 102 via an actuated latch, a clamp, or similar. In this regard, the end effector 102 may be programmed to discard the used presser foot 606*a* in a pre-determined area by actuating the attaching latch. The end effector 102 may pick up a new presser foot 606*b* via a similar actuation mechanism. This tends to ensure that the self-cleaning system remains functional throughout through thickness reinforcement operations. The process of discarding a used presser foot 606*a* and picking up a new presser foot 606*b* may be automated, in accordance with various embodiments.

Systems and methods of the present disclosure include a tool for producing composite preforms with tailored in-plane and interlaminar properties. Systems and methods of the present disclosure enable the ability to needle on a complex contour preform. Systems and methods of the present disclosure allow for precisely controlling and programing needling location, angle, depth, and areal density. Systems and methods of the present disclosure allow spatially varying the needling parameters to vary interlaminar versus in-plane properties based on the desired application. Systems and methods of the present disclosure enable fabrication of 2.5D complex contour composite preforms for aerospace structures. Systems and methods of the present lend themselves to fully automated fabrication to reduce costs, improve reproducibility, and scale to production rates.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An end effector for the through thickness reinforcement of a fibrous preform, the end effector comprising:

a body;

a presser foot mounted to the body and moveable with respect to the body, the presser foot defines a cavity;

a needle mounted to the body and moveable with respect to the body between a first extended position, wherein the needle extends from the cavity, and a first retracted position, wherein the needle retracts into the cavity; and a needle cleaning material coupled to the presser foot.

2. The end effector of claim 1, wherein:

the needle is moveable with respect to the presser foot between the first extended position and the first retracted position; and the needle cleaning material is configured to slidingly contact the needle while the needle moves between the first extended position and the first retracted position to clean a surface of the needle.

3. The end effector of claim 1, wherein:

the presser foot is configured to move with respect to the body between a second extended position and a second retracted position; and the needle cleaning material is configured to slidingly contact the needle while the presser foot moves between the second extended position and the second retracted position to clean a surface of the needle.

4. The end effector of claim 1, wherein the needle cleaning material comprises at least one of a bristle brush or a rigid foam.

5. The end effector of claim 1, wherein the needle extends through the presser foot.

6. The end effector of claim 5, wherein the needle cleaning material extends from an interior surface of the presser foot.

7. The end effector of claim 3, further comprising a spring member configured to bias the presser foot to the second extended position.

8. The end effector of claim 3, further comprising an actuator for moving the presser foot between the second extended position and the second retracted position.

9. The end effector of claim 1, further comprising an actuator for moving the needle between the first extended position and the first retracted position.

10. The end effector of claim 1, further comprising a rotary apparatus for rotating at least one of:

the presser foot with respect to the needle; or the needle with respect to the presser foot;

wherein the needle cleaning material is configured to slidingly contact the needle while at least one of the presser foot rotates with respect to the needle or the needle rotates with respect to the presser foot.

11. The end effector of claim 1, wherein the presser foot comprises a cylindrical body defining the cavity.

12. The end effector of claim 11, wherein the cylindrical body has a hemispherical-shaped end.

13. An end effector for through thickness reinforcement of a fibrous preform, the end effector comprising:

a body;

a presser foot mounted to the body and moveable with respect to the body, the presser foot comprises a cylindrical body defining a cavity;

a needle mounted to the body and moveable with respect to the body; and a needle cleaning material coupled to the presser foot, the needle cleaning material is configured to contact the needle.

14. The end effector of claim 13, further comprising a rotary apparatus configured to rotate the needle with respect to the presser foot, wherein the needle cleaning material slidingly engages the needle while the needle rotates with respect to the presser foot.

15. The end effector of claim 13, wherein:

the needle cleaning material extends from an interior surface of the presser foot toward the needle; and the needle extends at least partially through the presser foot.

16. The end effector of claim 13, further comprising a rotary apparatus configured to rotate the presser foot with respect to the needle, wherein the needle cleaning material slidingly engages the needle while the presser foot rotates with respect to the needle.

* * * * *